Patented Sept. 21, 1926.

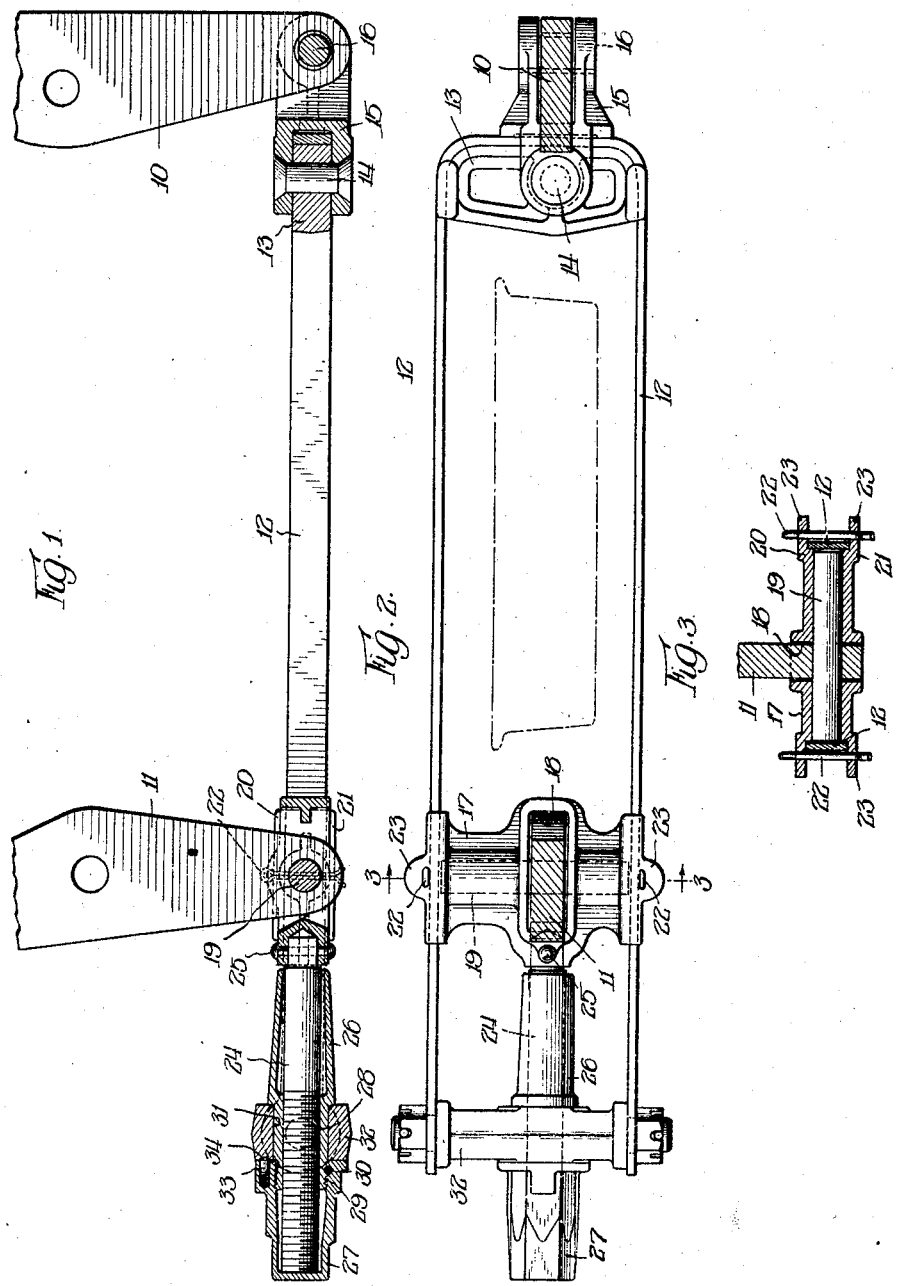

1,600,821

UNITED STATES PATENT OFFICE.

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

BRAKE-SLACK-ADJUSTER COMBINATION.

Application filed November 28, 1924. Serial No. 752,538.

This invention relates to a brake slack adjuster combination which is used in a rigging of the beamless type in which the truck levers are located in the plane of the brake shoes and wheels.

One object of the invention is to provide in the beamless type of brake rigging a simple, efficient and durable brake slack adjuster which includes means for protecting the threaded members against dirt, dust and the like.

Another object is to provide a brake slack adjuster in which the parts cooperate in an improved manner to meet the various requirements under operating conditions.

These and other objects are accomplished by means of the arrangement shown on the accompanying sheet of drawings, in which Figure 1 is a fragmentary side elevation of brake mechanism used in the beamless type of brake embodying my invention and showing a vertical section of certain of the parts:

Figure 2 is a top plan view of the arrangement shown in Figure 1, the brake levers being shown in section; and, Figure 3 is a sectional view taken in the plane of line 3—3 of Figure 2.

The various novel features of the invention will be apparent from the following description and drawings and will be particularly pointed out in the appended claims.

Referring to the figures of the drawings, it will be noted that the invention is illustrated in connection with the beamless type of brake rigging in which the brake levers 10 and 11 are located in the plane of the truck wheels. A tension rod in the form of a frame has side arms 12 which are located on opposite sides of a truck wheel. A bracket 13 is mounted in the looped end of the frame, and secured to the bracket by a rivet 14 is a jaw 15 pivotally connected at 16 to the lower end of the brake lever 10.

The other brake lever 11 is adjustably connected to the tension rod or frame and guidedly supported therein by means including a fulcrum block 17. The fulcrum block 17 is provided with a central opening 18 into which the lower end of the brake lever 11 extends and said end of the brake lever 11 is pivotally connected to the fulcrum block 17 by a pin 19, normally confined in position by the side arms 12. The fulcrum block has upper and lower flanges 20 and 21 which guidedly engage the upper and lower surfaces respectively of the side arms for guiding the fulcrum block in its movements. Keys 22 pass through openings in wings 23 of said flanges 20 and 21 for assisting in holding the fulcrum block 17 in position with respect to the side arms 12.

For adjusting the fulcrum block, and, accordingly, the brake lever 11 to compensate for slack caused, for example, by wearing of the brake shoes, a screw 24 is operatively connected, as at 25, to the fulcrum block 17. A two part nut, or a nut having two housing portions 26 and 27 cooperates with the screw 24 for adjustment purposes above mentioned. More strictly speaking, the nut member 26, including the threaded portion 28, directly engages the thread on the screw 24, and said nut portion 26 is connected to the nut portion 27 by inter-engaging threads 29. Said nut portions or housings 26 and 27 are locked with respect to each other by any suitable member 30 so that the nut members 26 and 27 operate as a single integral piece so far as adjusting the position of the fulcrum block 17 is concerned. The nut member 26 passes through an aperture 31 in an end frame piece 32, which connects associated ends of the side arms 12.

From the arrangement thus far described, it will be observed that by turning the nut member 27, by applying a wrench to the end thereof, the screw 24 may be moved in one direction or the other for adjusting the position of the fulcrum member 17, thereby varying slack conditions. It will be observed also that the screw 24 is completely enclosed and accordingly, protected from dirt, dust and other foreign materials. The screw 24 may be yieldably held in adjusted position by a spring pressed detent 33 carried in the nut housing 27 and cooperating with any one of the notches or pockets 34 formed in the frame member 32.

By means of this arrangement, the required adjustment for rectifying slack conditions in the beamless type of brake rigging may be easily and quickly made, and at the same time the thread of the slack adjusting screw will be protected against foreign material so that the adjustment may be greatly facilitated.

I claim:

1. In brake mechanism, the combination of a frame including arms for location on opposite sides of a truck wheel, a brake lever operatively connected to one end thereof, a second brake lever adjustably connected to said frame, the adjustable connecting means including a lever fulcrum block movably carried by said arms, a screw secured to said fulcrum block, and a nut cooperating with said screw for adjusting said fulcrum block and having a housing for covering and protecting said screw.

2. In brake mechanism, the combination of a frame including arms for location on opposite sides of a truck wheel, a brake lever operatively connected to one end thereof, a second brake lever adjustably connected to said frame, the adjustable connecting means including a lever fulcrum block movably carried by said arms, a screw secured to said fulcrum block, a nut cooperating with said screw for adjusting said fulcrum and having a housing for covering and protecting said screw, and means for locking said screw in adjusted position.

3. In brake mechanism, the combination of a frame including arms for location on opposite sides of a truck wheel, a brake lever operatively connected to one portion of the frame, a second brake lever adjustably connected to another portion of said frame, the adjustable connecting means including a lever fulcrum block movably carried by said arms, a member bridging said arms, a screw operatively connected to said fulcrum block and passing through said bridging member, and a nut cooperating with said screw for adjusting said fulcrum block and having a housing for covering and protecting said screw.

4. In brake mechanism, the combination of a frame including arms for location on opposite sides of a truck wheel, a brake lever operatively connected to one portion of the frame, a second brake lever adjustably connected to another portion of said frame, the adjustable connecting means including a lever fulcrum block movably carried by said arms, a member bridging said arms, a screw operatively connected to said fulcrum block and passing through said bridging member, a nut cooperating with said screw for adjusting said fulcrum block and having a housing for covering and protecting said screw, and means associated with said nut and bridging member for holding said screw in adjusted position.

Signed at Chicago, Illinois, this 2nd day of November, 1924.

WILLIAM C. HEDGCOCK.